United States Patent [19]

Kitahara et al.

[11] Patent Number: 4,996,030

[45] Date of Patent: Feb. 26, 1991

[54] METHOD FOR CLEANING EXHAUST GASES

[75] Inventors: Koichi Kitahara; Takashi Shimada; Noboru Akita; Tadashi Hiramoto; Kohhei Sasaki, all of Kanagawa, Japan

[73] Assignee: Japan Pionics, Ltd., Tokyo, Japan

[21] Appl. No.: 200,886

[22] Filed: Jun. 1, 1988

[30] Foreign Application Priority Data

Jun. 1, 1987 [JP] Japan .................. 62-134932
Jun. 1, 1987 [JP] Japan .................. 62-134931

[51] Int. Cl.$^5$ ............................. B01D 53/34
[52] U.S. Cl. ................................... 423/210
[58] Field of Search ..................... 423/210, 248

[56] References Cited

U.S. PATENT DOCUMENTS

| | | |
|---|---|---|
| 4,532,115 | 7/1985 | Nishino et al. ............ 423/210 |
| 4,731,333 | 3/1988 | Kitahara et al. ............ 436/103 |
| 4,743,435 | 5/1988 | Kitahara et al. ............ 423/210 |

FOREIGN PATENT DOCUMENTS

| | | |
|---|---|---|
| 1131512 | 6/1962 | Fed. Rep. of Germany . |
| 95119 | 5/1987 | Japan .................. 423/210 |
| 184728 | 6/1936 | Switzerland . |
| 328592 | 4/1930 | United Kingdom ......... 423/210 |

OTHER PUBLICATIONS

Patent Abstracts of Japan, vol. 9, No. 200 (C-298) (1923), 16th Aug. 1985.

Primary Examiner—Jeffrey E. Russel
Attorney, Agent, or Firm—Sughrue, Mion, Zinn, Macpeak & Seas

[57] ABSTRACT

A method for cleaning an exhaust gas comprising a base gas and at least one toxic component selected from the group consisting of arsine, phosphine, diborane and hydrogen selenide is disclosed. The method comprises contacting the exhaust gas with a molded cleaning agent having a composition consisting essentially of (1) cupric oxide, (2) manganese dioxide, and (3) at least one metal oxide selected from the group consisting of silicon oxide, aluminum oxide and zinc oxide and having a density of from 0.6 to 1.5 g/ml, said composition having a metal atomic ratio $M/(M+Cu+Mn)$ in the range of from 0.02 to 0.70 and a metal atomic ratio $Cu/(Cu+Mn)$ in the range of from 0.1 to 0.9; wherein Cu represents a number of gram atom of copper; Mn represents a number of gram atom of manganese; and M represents a total number of gram atom of silicon, aluminum and/or zinc, to remove the toxic component from the exhaust gas. The method is effective even at low temperatures below 10° C.

6 Claims, 1 Drawing Sheet

METHOD FOR CLEANING EXHAUST GASES

FIELD OF THE INVENTION

This invention relates to a method for cleaning exhaust gases and, more particularly, it relates to a method for cleaning exhaust gases containing toxic components discharged from the production step of semi-conductors, etc.

BACKGROUND OF THE INVENTION

With recent developments of industry in semiconductors and optoelectronics, use of highly toxic hydrides such as arsine, phosphine, diborane, and hydrogen selenide has markedly increased.

These toxic components are essentially required as raw materials or doping gases in the production of silicon semi-conductors, compound semi-conductors or optical fibers.

Exhaust gases discharged from the process for the production of semi-conductors or optical fibers generally contain unreacted toxic components and, in view of their high toxicity to living organisms, these toxic components must be removed from the exhaust gases before these gases are discharged to open atmosphere in order to prevent environmental pollution. For example, from considerations for working hygiene, threshold limit values (TLV) of arsine, phosphine, diborane, and hydrogen selenide are 0.05 ppm, 0.3 ppm, 0.1 ppm, and 0.05 ppm, respectively.

Known methods for removing such toxic components from the exhaust gas include a wet process which comprises absorbing and decomposing the toxic components in a scrubber, and a dry process which comprises passing the exhaust gas through a column packed with a cleaning agent such as adsorbents or oxidizing agents.

The conventional wet process generally has problems such as corrosion of the apparatus due to the use of an absorbing liquid and difficulty of post-treatment of the absorbing liquid, and thus the wet process is expensive for maintenance of the apparatus.

On the other hand, the conventional process using a cleaning agent comprises oxidative removal of phosphine or arsine by the use of an adsorbing agent, for example, nitrates, e.g., silver nitrate, supported on a porous carrier, or metal chlorides, e.g., ferric chloride, impregnated in a porous carrier, as disclosed in Japanese Patent Application (OPI) No. 89837/81 (the term "OPI" as used herein means a published unexamined patent application). Although this process has solved the problems associated with the above-described wet process, it still has problems such that the exhaust gas discharged from the chemical vapor deposition process (CVD) must be preliminarily subjected to wetting treatment thereby requiring a complicated apparatus.

A further conventional process comprises treating arsine or phosphine with three different absorbents, i.e., inorganic silicates impregnated separately with (1) an aqueous solution of an alkali, (2) an aqueous solution of an oxidizing agent, and (3) an aqueous solution of an alkali and an oxidizing agent, as disclosed in Japanese Patent Publication No. 49822/84. However, this process also involves treatments under wet conditions and, therefore, has the same disadvantages as described above for the wet process.

It has also been proposed to remove arsenic compounds from hydrocarbons mainly comprising propylene in a dry process, in which the hydrocarbons are contacted with a molded catalyst consisting of copper oxide, manganese dioxide or a mixture thereof as disclosed in Japanese Patent Application (OPI) No. 77627/82. However, the molded catalyst obtained directly from copper oxide or manganese dioxide is so brittle that it is broken during use, causing incorporation of the powderous fragments into gas or clogging of the adsorbing column. A great increase of a molding density may somewhat eliminate these disadvantages but, in turn, seriously reduces gas cleaning capacity of the catalyst.

In the chemical war, arsine had been removed by a dry process using a gas mask filled with activated carbon. By taking advantage of adsorption ability of activated carbon, various attempts have been made to improve the performance of activated carbon by incorporating various materials into activated carbon by absorption. For example, U.S. Pat. No. 4,532,115 discloses adsorbing agents for removing arsine or phosphine which comprises activated carbon as a carrier having incorporated therein a copper compound, an alkali metal compound, an alkaline earth metal compound, and at least one compound of Al, Ti, V, Cr, Mn, Fe, Co, Ni, Zn, Cd and Pb. Although these adsorbing agents are advantageous in that they can be used in a completely dry state and that they are strong owing to the use of activated carbon as a carrier, their capability of removing arsine, etc. is relatively low. Moreover, since these adsorbing agents generate heat upon contact with air after adsorption of arsine, etc., involving a risk that the activated carbon may ignite depending on conditions, they are limited in conditions for industrial use.

In order to eliminate the disadvantages associated with the above-described conventional techniques, the inventors previously proposed a method for cleaning an exhaust gas comprising contacting the exhaust gas with a molded cleaning agent composed of (1) cupric oxide and (2) at least one metal oxide selected from the group consisting of silicon oxide, aluminum oxide and zinc oxide, as disclosed in EPC 0194366 (corresponding to Japanese Patent Application (OPI) No. 209030/86 and U.S. Pat. No. 4,743,435).

The above-mentioned cleaning agent has an advantage of a markedly higher cleaning capacity, i.e., a maximum volume of a toxic component which can be removed per unit weight or unit volume (hereinafter referred to as saturated cleaning capacity), as compared with the conventional cleaning agents.

However, in spite of the high saturated cleaning capacity, this cleaning agent (hereinafter called a high capacity type cleaning agent) has been proved incapable of achieving a sufficient rate of cleaning depending on conditions, for example, when used at low temperatures such as 10° C. or lower. In other words, in cases where a cleaning column packed with this cleaning agent is used outdoor in winter, breakthrough is reached in a relatively short period of time when used at a low temperature under a high load, resulting in leakage of toxic components in low concentrations at the outlet of the column.

SUMMARY OF THE INVENTION

One object of this invention is to provide a method for effectively removing toxic components contained in an exhaust gas.

Another object of this invention is to provide a method for cleaning an exhaust gas containing toxic components in an completely cry state without requiring a wetting treatment of the exhaust gas.

A further object of this invention is to provide a method for cleaning an exhaust gas containing toxic components at a high rate, assuring removal of the toxic components even at a low temperature, e.g., 10° C. or lower.

A still further object of this invention is to provide a method for cleaning an exhaust gas containing toxic components using a cleaning agent which is free from a fear of ignition even if it generates heat upon contact with air after use.

A yet further object of this invention is to provide a method for cleaning an exhaust gas containing toxic components using a cleaning agent which has a markedly improved rate of removing the toxic components and a markedly increased cleaning capacity when combined with a high capacity type cleaning agent consisting of cupric oxide and at least one metal oxide selected from silicon oxide, aluminum oxide and zinc oxide.

As a result of extensive investigations, the inventors have found that the toxic components can be removed effectively from exhaust gases even at low temperatures by using a low-temperature type cleaning agent consisting of (1) cupric oxide, (2) an oxide of silicon, aluminum or zinc and, in addition, (3) manganese dioxide. Investigations have further been continued, thus reaching the present invention.

This invention relates to a method for cleaning an exhaust gas containing at least one toxic component selected from the group consisting of arsine, phosphine, diborane and hydrogen selenide, which comprises contacting the exhaust gas with a molded low-temperature type cleaning agent having a composition consisting essentially of (1) cupric oxide, (2) manganese dioxide, and (3) at least one metal oxide selected from the group consisting of silicon oxide, aluminum oxide and zinc oxide and having a density of from 0.6 to 1.5 g/ml, said composition having a metal atomic ratio m/(M+Cu+Mn) in the range of from 0.02 to 0.70 and a metal atomic ratio Cu/(Cu+Mn) in the range of from 0.1 to 0.9, wherein Cu represents a number of gram atom of copper; Mn represents a number of gram atom of manganese; and M represents a total number of gram atom of silicon, aluminum and/or zinc, to remove the toxic component from the exhaust gas.

Figure 1:
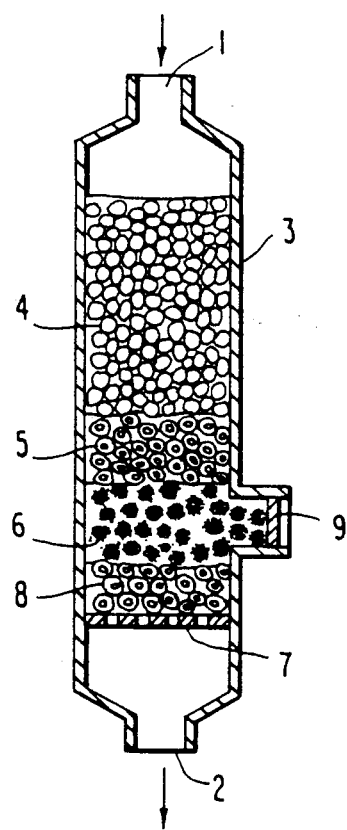
FIG. 1 illustrates an example of a cleaning column which can be used in the present invention.

In the cleaning column of FIG. 1, a low-temperature type cleaning agent according to the present invention is packed in the downstream side, while a conventional high capacity type cleaning agent is packed in the upstream side.

DETAILED DESCRIPTION OF THE INVENTION

The method of this invention can be applied to exhaust gases comprising a base gas of nitrogen, hydrogen, argon, helium, etc. and at least one toxic component selected from arsine, phosphine, diborane and hydrogen selenide.

The low-temperature type cleaning agent used in the present invention is a molding of a composition consisting of (1) cupric oxide, (2) manganese dioxide, and (3) at least one metal oxide selected from the group consisting of silicon dioxide, aluminum oxide and zinc oxide, the composition having a metal atomic ratio M/(M+Cu+Mn) in the range of from 0.02 to 0.7, preferably from 0.03 to 0.55, and a metal atomic ratio Cu/(Cu+Mn) in the range of from 0.1 to 0.9, preferably from 0.2 to 0.8, wherein Cu represents a number of gram atom of copper; Mn represents a number of gram atom of manganese; and M represents a total number of gram atom of silicon, aluminum and/or zinc.

If the metal atomic ratio M/(M+Cu+Mn) is smaller than 0.02, the composition finds difficulty in molding. If it exceeds 0.7, the maximum cleaning capacity of the cleaning agent per unit weight or unit volume, i.e., the saturated cleaning capacity decreases. On the other hand, if the metal atomic ratio Cu/(Cu+Mn) is smaller than 0.1, that is, if the proportion of copper is too low, the saturated cleaning capacity decreases. If it exceeds 0.9, that is, if the proportion of manganese is too small, the rate of cleaning at a low temperature is reduced. In either case, the time period until the cleaning agent reaches breakthrough becomes short, failing to achieve a prescribed cleaning efficiency depending on conditions such as a load.

According to the present invention, the toxic component can be removed from an exhaust gas by fixation to the low-temperature type cleaning agent through reaction but not through mere adsorption or absorption.

The low-temperature type cleaning agent used in the present invention can be prepared by various processes. For example, an alkali such as sodium hydroxide, potassium hydroxide, sodium carbonate, potassium carbonate, sodium bicarbonate, potassium bicarbonate, ammonia and the like is added to a metal salt such as a nitrate, a sulfate, a chloride, an organic acid salt, etc. of copper or zinc to precipitate an intermediate of an oxide, and the resulting intermediate is calcined to obtain cupric oxide or zinc oxide. The oxide is then mixed with other metal oxides so as to have the above-specified composition, followed by molding. It is preferable that the intermediate of an oxide obtained as a precipitate on addition of an alkali to a metal salt, i.e., a hydroxide or a basic carbonate, be mixed with other metal oxides so as to have the above-specified composition, molded into a prescribed shape, followed by calcining to convert the intermediate to cupric oxide or zinc oxide. In particular, it is more preferred to use a basic carbonate obtained by using, as alkali, sodium carbonate, potassium carbonate, sodium bicarbonate or potassium bicarbonate.

The oxide of aluminum or silicon to be used in the cleaning agent of the invention includes alumina sol or silica sol. The alumina sol or silica sol can be prepared by a process comprising neutralizing an aqueous solution of sodium aluminate or sodium silicate with a mineral acid and removing a sodium salt of the mineral acid from the thus formed sol by electric dialysis, or a process comprising treating an aqueous solution of sodium aluminate or sodium silicate with a cation exchange resin.

The manganese dioxide to be used in the cleaning agent of the invention can be obtained by, for example, decomposition of potassium permanganate in nitric acid, oxidation of manganese sulfate with potassium permanganate, treatment of inactive manganese dioxide with hot concentrated nitric acid, or the like technique.

It is also possible to utilize various commercially available products of cupric oxide, basic copper carbonate, manganese dioxide, zinc oxide, basic zinc carbonate, alumina sol, silica sol, etc.

In the present invention, the cleaning agent having the above-described composition can be used as molded in pellets, etc. or in any shape obtained by crushing the molded pellets into an appropriate particle size.

The composition can be molded either in a dry process or in a wet process. If desired, a small amount of water or a lubricating agent may be added to the composition to be molded. The shape of the molded composition is not particularly limited and typically includes spherical, cylindrical and rod shapes. The spherical shape preferably has a diameter of from 1 to 12 mm, and the cylindrical shape preferably has a diameter of from 1 to 12 mm and a height of from 2 to 12 mm. As is known in the chemical industry, materials to be packed in a column should have a particle size of less than about 1/10 the inner diameter of the column. Accordingly, as long as the molded particles of the cleaning agent of the present invention have a particle size within such a range, they can be used advantageously without causing an irregular current of an exhaust gas stream during passing through the column.

The particles of the cleaning agent used in the present invention have a density ranging from 0.6 to 1.5 g/ml. The term "density of particles" as used herein means a quotient obtained by dividing a weight of a molded particle by its geometrical volume. The packing density preferably ranges from 0.4 to 1.0 g/ml. The term "packing density" as used herein means a numerical value obtained by dividing a weight of a molded particle packed in the column by a volume of the packed particle. If the density of the particles is less than 0.6 g/ml or if the packing density is less than 0.4 g/ml, not only the molded particles tend to be brittle but also the saturated cleaning capacity of the cleaning agent is reduced. On the other hand, if the density of the particles is more than 1.5 g/ml or the packing density is more than 1.0 g/ml, there is a fear that the rate of cleaning at low temperatures would be reduced.

The low-temperature type cleaning agent is generally used in this invention as a fixed bed filled in a column or tube. It may also be used as a moving bed or a fluidized bed. The exhaust gas containing toxic components (hereinafter referred simply to "exhaust gas") is contacted with the cleaning agent while passing through a column packed with the cleaning agent whereby the toxic components are removed.

The exhaust gas to be applied to the method of this invention is not particularly limited in concentration of toxic components contained therein and in flow velocity. In general, it is preferable to decrease the flow velocity of the gas as the concentration of toxic components increases. In practical application of the present invention, with the concentration of the toxic component being 10%, 1%, or 0.1%, a preferred superficial linear velocity of the exhaust gas in a column is usually not more than 1 cm/sec, not more than 5 cm/sec, or not more than 30 cm/sec, respectively.

The exhaust gas to be treated in the method of this invention is generally in a dry state, but a wet exhaust gas may also be treated unless the gas forms moisture condensation in the column filled with the cleaning agent.

An inlet gas temperature of the exhaust gas at which the exhaust gas is contacted with the cleaning agent is usually controlled to a range of from $-20°$ C. to $100°$ C., preferably $-20°$ C. to $40°$ C. Since an excellent cleaning ability can be attained in such a broad temperature range, the method of the present invention does not require heating or cooling.

The exhaust gas can be treated under atmospheric pressure, reduced pressure or pressurized conditions. In general, the pressure of the exhaust gas is adjusted to 20 kg/cm$^2$ abs (absolute pressure) or less, preferably to a range of from 0.001 to 10 kg/cm$^2$ abs.

In a preferred embodiment of the present invention, the cleaning capacity of the low-temperature type cleaning agent can be enhanced by combining with a known high capacity type cleaning agent.

The high capacity type cleaning agent to be combined is a molded composition comprising (1) cupric oxide and (2) at least one melt oxide selected from the group consisting of silicon dioxide, aluminum oxide and zinc oxide. The cleaning agent of this type has a greater saturated cleaning capacity as compared with the low-temperature type cleaning agent of the present invention, though relatively inferior in cleaning rate.

The composition of the high capacity type cleaning agent has a metal atomic ratio M/(M+Cu) ranging from 0.02 to 0.7, preferably from 0.03 to 0.55, wherein M and Cu are as defined above. In preparing the high capacity type cleaning agent, the molding method, shape and size are similar to those described for the above-described low-temperature type cleaning agent. However, the density of molded particles is generally higher than that of the low-temperature type cleaning agent, ranging from 1.5 to 3.5 g/ml.

In cases where the low-temperature type cleaning agent is combined with the high capacity type cleaning agent, the exhaust gas is brought into contact first with the high capacity type cleaning agent and then with the low-temperature type cleaning agent. The contacting can usually be carried out by means of a cleaning column made of a metal, quartz glass, rigid plastics, etc. and having an inlet and an outlet for a gas. The high capacity type cleaning agent is filled in the inlet side, while the low-temperature type cleaning agent in the outlet side. The ratio of the high capacity type cleaning agent to the low-temperature type cleaning agent to be filled in a cleaning column cannot be definitely specified as it varies depending on the velocity of the exhaust gas, the concentration of the toxic component, the contact temperature of the cleaning agents and the exhaust gas, or the like factor. Generally speaking, it is preferable that the amount of the low-temperature type cleaning agent be smaller than that of the high capacity type cleaning agent. For example, the length of the packed low-temperature type cleaning agent layer in the column (packed length) is usually in the range of from 2 to 40%, preferably from 5 to 30%, based on the total packed length of the cleaning agent layers.

The cleaning column to be used is not particularly limited in size but, for practical use, generally has an inner diameter of from 50 to 1,000 mm. The total packed length of the cleaning agent(s) in the column is generally from 200 to 2,000 mm.

For the purpose of detecting or predicting breakthrough of a cleaning column by toxic components, the column is preferably provided with a detecting agent layer in addition to a cleaning agent layer. In a combined use of the low-temperature type cleaning agent and the high capacity type cleaning agent, the detecting agent layer may be provided between the two cleaning agent layers, or in the midway of the low-temperature type cleaning agent layer, or in the downstream side relative to the low-temperature type cleaning agent layer. It is generally preferable to fill the detecting agent in the midway of the low-temperature type cleaning agent layer. More specifically, the total packed length of the cleaning agents and the detecting agent being 2,000 mm, the column is packed with the high capacity type cleaning agent to a length of 1,500 to 1,940 mm, the low-temperature type cleaning agent to a length of 10 to 200 mm, and the detecting agent to a length of 30 to 200 mm, in the order of from an inlet side toward an outlet side.

The cleaning column is usually composed of a single cylinder or, according to a space permitted for installation, may be composed of a plurality of cylinders. For example, it may be composed of a first cylinder filled with a high capacity type cleaning agent and a second cylinder filled with a low-temperature type cleaning agent and a detecting agent which are serially connected by piping and the like.

The detecting agent to be used is not restricted as long as it is capable of detecting toxic components in the exhaust gas with high sensitivity. In particular, a detecting agent comprising basic copper carbonate as a color changing component carried on a support as disclosed in U.S. Pat. No. 4,731,333 is preferred because of its high detecting sensitivity commonly to arsine, phosphine, diborane and hydrogen selenide.

The present invention will be illustrated by referring to FIG. 1 showing a longitudinal cross section of an exhaust gas cleaning column filled with the low-temperature type cleaning agent according to the present invention in combination with a high capacity type cleaning agent and a detecting agent. In Fig. 1, stainless steel-made cylindrical container 3 having inlet 1 and outlet 2 for an exhaust gas is filled with first layer 4 comprising a high capacity type cleaning agent, second layer 5 comprising a low-temperature type cleaning agent, third layer 6 comprising a detecting agent, and fourth layer 8 comprising: a low-temperature type cleaning agent in the order of from the upstream side toward the downstream side. The lower end of third layer 6 is supported by grating plate 7. Container 3 has peep window 9 made of reinforced glass on its side wall at the position corresponding to the detecting agent layer, i.e., third layer 6.

The above-described cleaning column can be used as connected to a pipe for discharging an exhaust gas led from, for example, the semi-conductor production process. A gas containing toxic components discharged from the semi-conductor production process, etc. is introduced first into first layer 4 through inlet 1 where it contacts with the high capacity type cleaning agent having a high saturated cleaning capacity thereby to remove the most part of the toxic components in the exhaust gas. When the cleaning column is used under a low temperature condition as in winter, the gas is forwarded to second layer 5 without being cleaned sufficiently. In second layer 5, the remaining toxic components can be removed almost completely upon contact with the low-temperature type cleaning agent having a high cleaning rate even at a low temperature, thereby preventing the cleaning column from reaching breakthrough in a short period of time. The thus cleaned gas is then introduced into third and fourth layers and discharged into open atmosphere through outlet 2. As time elapses, the amount of the removed toxic component increases, approaching saturation of the cleaning agents. When layers 4 and 5 reach a breakthrough point, the toxic component begins to be incorporated into the gas passing through third layer 6, and the detecting agent is thereby colored. At this point, the toxic component having passed through the detecting agent layer can be removed by the low-temperature type cleaning agent of fourth layer 8 so that it is not discharged outside of the column, while the gas is passing through fourth layer 8, the cleaning column can be exchanged by another one to prevent discharge of the toxic component outside.

According to the present invention, since toxic components contained in exhaust gases can be removed efficiently even at such a low temperature below 10° C. at which the conventional methods could not sufficiently attain the aim, the method of the invention can be safely applied even under a low temperature condition as in winter.

The low-temperature type cleaning agent according to the present invention can be used in combination with a high capacity type cleaning agent to further ensure the efficiency in removal of a large quantity of toxic components.

Further, the cleaning method of the present invention requires no wetting treatment of the exhaust gas which is usually performed by means of a bubbler provided on the upstream side of a cleaning column. Therefore, a cleaning column may be provided in the upstream side relative to a vacuum pump for suction of the exhaust gas. Such a system design makes it possible to treat the exhaust gas under reduced pressure. In this manner, the exhaust gas passes through the vacuum pump after toxic components have been removed therefrom, so that the pump oil is free from contamination with toxic components, thus facilitating maintenance of the vacuum pump.

The present invention is now illustrated in greater detail by way of the following Examples and Comparative Examples, but it should be understood that the present invention is not deemed to be limited thereto. In these examples, all percents are by weight unless otherwise indicated.

EXAMPLES 1 TO 13

Preparation of Materials for Cleaning Agent:

(1) Basic Copper Carbonate:

A 20% sodium carbonate aqueous solution was added to a 20% copper sulfate aqueous solution until the solution had a pH of 9 to 10 to precipitate crystals of basic copper carbonate. The crystallization procedure was repeated, and the precipitate was collected by filtration and washed with water to obtain basic copper carbonate.

(2) Manganese Dioxide:

A 10% barium chlorate aqueous solution was mixed with a stoichiometric amount of a 10% manganese sulfate aqueous solution to precipitate barium sulfate. After removing the barium sulfate by filtration, the filtrate was evaporated at 50° C. for 10 hours to obtain crude manganese dioxide, which was then stirred in hot concentrated nitric acid for 5 hours, washed with an ion-exchanged water, followed by filtration. The filter cake was dried at 120° C. for 5 hours to obtain activated manganese dioxide.

(3) Alumina Sol:

"Cataloid-AS-2" produced by Shokubai Kagaku Kogyo Co., Ltd. was used.

(4) Silica Sol'

"Snowtex" produced by Nissan Chemicals Industries, Ltd. was used.

(5) Basic Zinc Carbonate:

A 20% sodium carbonate aqueous solution was added to a 20% zinc sulfate aqueous solution until the solution had a pH of 9 to 10. The thus precipitated crystals were filtered and washed to obtain basic zinc carbonate.

Preparation of Low-Temperature Type Cleaning Agent:

(1) Basic copper carbonate, (2) manganese dioxide, and (3) alumina sol, silica sol or basic zinc carbonate were mixed at prescribed metal atomic ratios M/(M+Cu+Mn) and Cu/(Cu+Mn) as shown in Table 1. The composition was kneaded in a kneader and molded by extrusion. The molded composition was calcined at 250° C. for 2 hours to convert the copper and zinc salts to the corresponding oxides to obtain a low-temperature type cleaning agent in the form of pellets each having a diameter of 2 mm, a length of 3 to 10 mm. The density of the pellets was about 1.0 g/ml and the packing density of pellets was 0.6 to 0.7 g/ml.

basic copper carbonate as a color changing component (detection sensitivity: 50 ppb).

The results obtained are shown in Table 1. As is seen from Table 1, the low-temperature type cleaning agents according to the present invention prove durable for an extended period of time even when used at a low contact temperature (5° C.) with the exhaust gas.

COMPARATIVE EXAMPLES 1 TO 3

Cleaning agents containing no manganese dioxide (Comparative Examples 1 and 2) and a cleaning agent containing ho cupric oxide (Comparative Example 3) were prepared according to the procedure of Examples 1 to 13.

The cleaning capacity of each of the resulting cleaning agents was evaluated in the same manner as in Examples, and the results obtained are shown in Table 1. It can be seen that the time before the breakthrough is remarkably shorter than that of the low-temperature type cleaning agent of the present invention, namely, approximately a half of the latter.

TABLE 1

| Example No. | Gas Composition | Cleaning Agent Composition | Metal Atomic Ratio M/M + Cu + Mn | Metal Atomic Ratio Cu/Cu + Mn | Time Before Breakthrough (min) |
|---|---|---|---|---|---|
| Example 1 | $AsH_3 + H_2$ | $CuO + MnO_2 + Al_2O_3$ | 0.14 | 0.42 | 168 |
| Example 2 | " | $CuO + MnO_2 + SiO_2$ | 0.12 | " | 130 |
| Example 3 | " | $CuO + MnO_2 + ZnO$ | 0.09 | " | 142 |
| Example 4 | $AsH_3 + N_2$ | $CuO + MnO_2 + Al_2O_3$ | 0.14 | " | 165 |
| Example 5 | $PH_3 + H_2$ | " | " | " | 183 |
| Example 6 | $SeH_2 + H_2$ | " | " | " | 149 |
| Example 7 | $B_2H_6 + H_2$ | " | " | " | 121 |
| Example 8 | $AsH_3 + H_2$ | $CuO + MnO_2 + Al_2O_3$ | 0.30 | " | 164 |
| Example 9 | $PH_3 + N_2$ | " | " | " | 170 |
| Example 10 | $SeH_2 + N_2$ | " | " | " | 132 |
| Example 11 | $SeH_2 + N_2$ | " | " | " | 114 |
| Example 12 | $AsH_3 + H_2$ | $CuO + MnO_2 + Al_2O_3$ | " | 0.80 | 185 |
| Example 13 | $PH_3 + H_2$ | $CuO + MnO_2 + Al_2O_3$ | 0.14 | " | 190 |
| Comparative Example 1 | $AsH_3 + N_2$ | $CuO + Al_2O_3$ | " | 1.0 | 65 |
| Comparative Example 2 | $PH_3 + N_2$ | " | " | " | 73 |
| Comparative Example 3 | $AsH_3 + H_2$ | $MnO_2 + Al_2O_3$ | " | 0 | 87 |

Determination of Cleaning Capacity:

In a quartz-made cleaning column (inner diameter=19 mm; height=400 mm) placed in a chamber kept at 5° C., each of the low-temperature type cleaning agents as prepared above was packed to a packed length of 200 mm and a packed volume of 56 ml.

A hydrogen or nitrogen gas containing 1 vol % of arsine, phosphine, diborane or hydrogen selenide as a toxic component was passed through the column at a rate of 100 l/hr (superficial linear velocity in a column=10 cm/sec). The gas at the outlet of the column was monitored by a detector to determine the time period before the breakthrough of the cleaning column. The toxic component was detected by the use of a spectrophotometer utilizing the principle of atomic-absorption spectroscopy ("HD-1" manufactured by Nippon Sanso Co., Ltd.). The point where the toxic component was clearly confirmed, specifically, when the concentration of arsine, phosphine or diborane reached 25 ppb, 31 ppb or 27 ppb, respectively, was taken as a breakthrough point. With respect to hydrogen selenide, since its criterion to be adopted to the above described detection system has not yet been specified, it was detected through color change of a detecting agent containing

EXAMPLES 14 TO 20

Preparation of Low-Temperature Type Cleaning Agent:

In the same manner as in Examples 1 to 13, low-temperature type cleaning agents having the metal atomic ratios shown in Table 2 were prepared.

Preparation of High Capacity Type Cleaning Agent:

(1) Cupric oxide and (2) alumina sol, silica sol or, zinc oxide were mixed at a prescribed metal atomic ratio M/(M+Cu) as shown in Table 2. The composition was kneaded in a kneader, calcined at 350° C. for 3 hours, and then tabletted to obtain pellets of a high capacity type cleaning agent each having a diameter of 5 mm and a length of 4 mm. The density of the pellets was about 2.55 g/ml and the packing density of the pellets was about 1.66 g/ml.

Preparation of Detecting Agent:

A 20% sodium carbonate aqueous solution was added dropwise to a 20% copper sulfate aqueous solution while stirring to form a precipitate of basic copper carbonate. The precipitate was filtered, washed, and dried at 100° C. to obtain basic copper carbonate as a blue powder. The powder was spread on α-alumina ("SA 5218" produced by Norton Co., Ltd.) having a specific surface area of 0.005 to 0.040 m²/g to obtain a detecting agent carrying about 4% of the powder.

Preparation of Cleaning Column:

A cleaning column having a packed layer structure as shown in FIG. 1 was prepared as follows. A stainless steel-made column having an inner diameter of 110.1 mm and a height of 800 mm was used. The column had a sight window of reinforced glass on its side wall where a detecting agent was to be packed and a grating plate for supporting a cleaning agent layer at the bottom part thereof.

The column was packed with 0.32 kg of the low-temperature type cleaning agent to form a fourth (undermost) layer having a length of 50 mm, followed by 0.39 kg of the detecting agent to form a third layer having a length of 40 mm, followed by 0.32 kg of the low-temperature type cleaning agent to form a second layer having a length of 50 mm, and followed by 4.1 kg of the high capacity type cleaning agent to form a first (uppermost) layer having a length of 265 mm.

Determination of Cleaning Capacity:

The above obtained cleaning column was placed in a chamber kept at 5° C. A hydrogen or nitrogen gas containing 0.5 to 1 vol % of arsine, phosphine, diborane or hydrogen selenide as a toxic component was passed through the column at a rate of 28.5 l/min (superficial linear velocity in a column: 5 cm/sec). The time required until the toxic gas was detected at the outlet of the column was measured in the same manner as in Examples 1 to 13. Further, the time required until the detecting agent changed its color and the amount of the toxic component removed up to that point were determined. The results of these measurements are shown in Table 3.

It can be seen from Table 3 that the cleaning column according to the present invention exhibits superior cleaning capacity even at a low temperature of 5° C.

replaced with the same high capacity type cleaning agent as used in Example 14.

The cleaning capacity of the resulting cleaning column was evaluated in the same manner as in Example 14. As a result, the time and the amount of the removed toxic component (AsH$_3$) before the detecting agent changed its color were 500 min and 48 l/l, respectively, and the time before the breakthrough was 550 min, indicating superiority of the cleaning method of the present invention to the method using the conventional high capacity cleaning agent alone.

While the invention has been described in detail and with reference to specific embodiments thereof, it will be apparent to one skilled in the art that various changes and modifications can be made therein without departing from the spirit and scope thereof.

What is claimed is:

1. A method for cleaning an exhaust gas comprising a base gas and at least one toxic component selected from the group consisting of arsine, phosphine, diborane and hydrogen selenide, which comprises contacting the exhaust gas at an inlet exhaust gas temperature between −20° and 40° C. with a molded cleaning agent having a composition consisting essentially of (1) cupric oxide, (2) manganese dioxide, and (3) at least one metal oxide selected from the group consisting of silicon oxide, aluminum oxide and zinc oxide and having a density of from 0.6 to 1.5 g/ml, said composition having a metal atomic ratio M/(M+Cu +Mn) in the range of from 0.03 to 0.55 and a metal atomic ratio Cu/(Cu+Mn) in the range of from 0.2 to 0.8, wherein Cu represents a number of gram atom of copper; Mn represents a number of gram atom of manganese; and M represents a total number of gram atom of silicon, aluminum and/or zinc, to remove the toxic component from the exhaust gas.

2. A method as claimed in claim 1, wherein said base

TABLE 2

| Example No. | High Capacity Type Cleaning Agent | | | Low-Temperature Type Cleaning Agent | | | |
|---|---|---|---|---|---|---|---|
| | Component | Metal Atomic Ratio M/(M + Cu) | Packing Density (g/ml) | Component | Metal Atomic Ratio | | Packing Density (g/ml) |
| | | | | | M/(M + Cu + Mn) | M/(Cu + Mn) | |
| 14–18 | CuO + Al$_2$O$_3$ | 0.07 | 1.66 | CuO + MnO$_2$ + Al$_2$O$_3$ | 0.30 | 0.42 | 0.67 |
| 19 | CuO + SiO$_2$ | " | " | " | 0.15 | " | " |
| 20 | CuO + ZnO$_2$ | 0.10 | " | CuO + MnO$_2$ + SiO$_2$ | " | " | " |

TABLE 3

| Example No. | Gas Composition | Concn. of Toxic Component (vol %) | Before Color Change of Detecting Agent | | Time Before Breakthrough (min) |
|---|---|---|---|---|---|
| | | | Time (min) | Amount of Removed Toxic Component (l/l)* | |
| 14 | AsH$_3$ + H$_2$ | 1 | 1400 | 133 | 1510 |
| 15 | PH$_3$ + H$_2$ | " | 1480 | 140 | 1630 |
| 16 | B$_2$H$_6$ + H$_2$ | 0.5 | 620 | 29 | 680 |
| 17 | H$_2$Se + H$_2$ | 1 | 1160 | 110 | 1320 |
| 18 | AsH$_3$ + N$_2$ | " | 1410 | 134 | 1520 |
| 19 | AsH$_3$ + H$_2$ | " | 1350 | 128 | 1460 |
| 20 | AsH$_3$ + H$_2$ | " | 1300 | 124 | 1420 |

Note:
*An averaged amount (l) of the gaseous toxic component removed per liter of the cleaning agents packed in the first and second layer.

COMPARATIVE EXAMPLE 4

A cleaning column was prepared in the same manner as in Example 14, except that the low-temperature type cleaning agent used as the 1st, 2nd, and 4th layers was gas of the exhaust gas is selected from nitrogen, hydrogen and helium.

3. A method as claimed in claim 1, wherein said contacting is carried out by passing the exhaust gas through a cleaning column packed with said cleaning agent.

4. A method as claimed in claim 3, wherein said cleaning column is further packed with a detecting agent by which breakthrough of the cleaning column is detected.

5. A method as claimed in claim 1, wherein the method further includes pretreatment of the exhaust gas containing a toxic component with a cleaning agent which has a saturated cleaning capacity greater than that of the molded cleaning agent of claim 1 comprising a molded composition consisting essentially of (4) cupric oxide and (5) at least one metal oxide selected from the group consisting of silicon dioxide, aluminum oxide and zinc oxide and having a density of from 1.5 to 3.5 g/ml, said composition having a metal atomic ratio $M/(M+Cu)$ in the range of from 0.02 to 0.70, wherein M represents a total number of gram atom of silicon, aluminum and/or zinc, and Cu represents a number of gram atom of copper.

6. A method as claimed in claim 5, wherein said contacting is carried out by passing the exhaust gas through a cleaning column packed with said cleaning agent which has a saturated cleaning capacity greater than that of the molded cleaning agent of claim 7 at the inlet side thereof and with said cleaning agent of claim 7 at the outlet side thereof.

* * * * *